United States Patent Office 3,470,148
Patented Sept. 30, 1969

3,470,148
REACTION PRODUCTS OF LIGNIN AND BARK EXTRACTS AND PROCESS FOR SAME
George Graham Allan, Seattle, Wash., assignor to Weyerhaeuser Company, Tacoma, Wash., a corporation of Washington
No Drawing. Filed Dec. 16, 1966, Ser. No. 602,185
Int. Cl. C07g 1/00
U.S. Cl. 260—124
9 Claims

ABSTRACT OF THE DISCLOSURE

Compounds made by reacting lignin containing materials, particularly kraft and sulfite lignins and alkaline extracts of barks of trees, with compounds such as cyanuric chloride, 2,4-dichloro-6-methoxy-s-triazine, choline chloride, hydrazides, tetrakishydroxymethyl phosphonium chloride. These compounds are useful as coagulants and coagulation aids.

This invention relates to processes for making compounds useful as coagulants and coagulation aids from forest-derived materials and to the novel products obtained thereby. Moreover, this invention relates to a method of coagulating colloidal suspensions using the novel products of this invention.

The clarification of water has, of recent, become most important in controlling pollution of the nation's water supplies and in treating water used in the chemical processing industry. One of the essential processes of the majority of water treatment plants involves the addition of a chemical coagulant which causes aggregation of some of the fine particles and absorption of others to produce a larger particle called a floc. The purpose of chemical coagulation of colloidal suspensions in sewage and other wastes is the removal of particulate matter which cannot be separated from the liquid by gravity alone. Solid particles in the colloidal state (approximately 1 m$\mu$ to 1$\mu$) which are dispersed in aqueous media are usually negatively charged and are maintained separate by mutual repulsive forces. If the charge on these particles is reduced to zero, the repulsive forces are eliminated enabling agglomeration and settling of suspended matter. In practice, the neutralization of these charges is best accomplished by reaction with either ions or colloids bearing charges opposite in sign to the charges on the colloids to be removed. As the majority of colloids in domestic sewage and other wastes is negatively charged, they are neutralized primarily by reaction or contact with materials which are cationic (positively charged) in character.

The chemicals which have been most useful as coagulants are salts of polyvalent metals, such as aluminum sulfate (alum), ferrous sulfate, ferric chloride, and lime. Alum, for example, functions as a coagulant by its tendency to hydrolyze and polymerize in aqueous solutions to a positively charged complex which links the small negatively charged particles together. Treatment with alum or with other inorganic salts has been successful in removing the coarse fraction (1 mm. to 1$\mu$ of electro-negative particles but not the fine fraction (1$\mu$ to 10 A.). The fine fraction has been removed, however, by employing simultaneously with the inorganic coagulant an organic polyelectrolyte. Many of the polyelectrolytes act as coagulants and coagulation aids, that is, they form large floc particles that settle through the solution and absorb the particles of coagulated turbidity. Coagulation aids act as "binders" in that they bind existing floc particles together into larger masses. The organic polyelectrolytes are classified as either cationic or anionic in character. Cationic polyelectrolytes are positively charged and will neutralize the negative charges on suspended particles, allowing them to agglomerate. Anionic polyelectrolytes are negatively charged and function as co-coagulants when applied along with a cationic material.

Many organic polyelectrolyte coagulants and coagulation aids are in commercial use today, but they suffer the disadvantage of being relatively expensive.

It is an object of this invention to provide novel compounds useful as coagulants and coagulation aids, the compounds derived from by-products of the wood industry.

It is a further object of this invention to provide a relatively simple and inexpensive process for making the novel products.

Phenolic bodies, particularly bark extractives and lignins, are readily available by-products of the wood industry and have been used extensively as dispersants by virtue of their low cost, availability, and polymeric nature. For example, see the article "Chemicals From the Other Half of the Tree" in Chemical and Engineering News, Feb. 11, 1963, pp. 83 to 89, and U.S. Patent No. 2,782,241.

It has now been found that these materials are useful as coagulation aids in conjunction with conventional inorganic polyvalent metal coagulants and/or organic polyelectrolytes. The particular forest-derived materials which may be used in this manner include the alkaline extracts of barks of trees and pulping liquors, particularly kraft lignins and sulfite lignins. These materials, which are anionic in character, are used to link or bridge the coagulated particles which as a result of coagulation have cationic sites to obtain larger, faster settling aggregates.

It has also been found that the coagulation activity of the phenolic bodies contained in bark extractives and pulping liquors can be substantially improved by chemical modification which increases the molecular weight of the material and, in some cases, decreases their anionic character. The anionic character of the phenolic materials may be diminished by reducing the number of free phenolic hydroxyl groups in the molecule and/or introducing cationic centers on the molecule. In particular, the phenolic material derived from bark extractives and pulping liquors may be chemically modified by reaction with at least one of the following:

(1) a aldehyde, such as formaldehyde or paraformaldehyde;

(2) a triazine derivative designated by

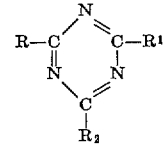

where R, R$^1$, and R$^2$ represent chlorine, methoxy groups or —NHCH$_2$OH groups;

(3) Y—CH$_2$—(CH$_2$)$_n$—X where $n$ is a positive integer from 0 to 5, X is one of the following:

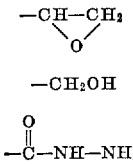

and Y is one of the following:

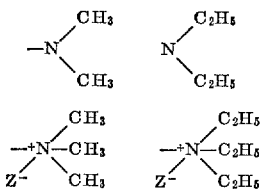

with Z⁻ being chlorine or bromine;

(4)

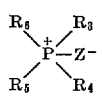

where Z⁻ is chlorine or bromine, and $R_3$, $R_4$, $R_5$, and $R_6$ are functional groups reactive with the phenolic compounds of the forest-derived products, for example, methylol groups;

(5)

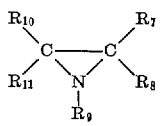

where $R_7$, $R_8$, $R_9$, $R_{10}$, and $R_{11}$ are hydrogen, aliphatic, aromatic, or various substituted aliphatic and aromatic groups.

Chemical modification can also be carried out by oxidative coupling of the phenolic forest-derived products with oxidizing agents, such as are used to convert vanillin to dehydrodivanillin or which promote the well known oxidative coupling reactions typified by the formation of usnic acid. Typical of such oxidizing agents are hydrogen peroxide, the alkali metal persulfates, permanganates and perborates.

Exemplary of some of the specific compounds which may be used for reaction with the phenolic forest-derived compounds are cyanuric chloride, formaldehyde, tetrakishydroxymethyl phosphonium chloride, trimethylolmelamine, 2,4 - dichloro-6-methoxy-s-triazine, choline chloride, NN-diethylglycidylamine, ethyleneimine, hydrazides, and amine-modified epoxy-compounds.

The phenolic forest-derived materials used in the process of this invention and present in the novel products are derived from bark extractives of trees and pulping liquors. Kraft and soda lignins as well as sulfite lignins may be used. The alkaline extracts of barks of trees are particularly useful. Such extracts may be obtained by a process described, for example, in U.S. Patents Nos. 2,890,231 and 3,255,221, which are hereby incorporated by reference.

The reaction between the phenolic forest-derived products and the various chemicals mentioned above is carried out by merely mixing the materials together. The reaction may be carried out in the presence of any inert liquid which may serve as a diluent. This liquid may or may not be a solvent for the reaction. The reaction mixture may be heated to increase the reaction rate, however, in most cases reaction proceeds at ambient temperatures. The weight ratio of phenolic compounds per modifying chemical may be varied to suit the particular requirements for which the compound is to be used. Generally a weight ratio of phenolic material to modifying chemical ranging from about 2:1 to 15:1 is adequate. Oxidative coupling of the phenolic forest-derived compounds is usually carried out under acidic conditions (pH 2–6) at temperatures ranging from 30 to 100° C. using one of the oxidizing agents specified above as suitable.

Because of the complex nature of the phenolic compounds derived from bark extractives and pulping liquors, the reaction of these materials with the various chemicals cannot be exactly formulated. The chemicals contained in bark extractives and in pulping liquors include ligneous materials having various functional groups such as phenolic hydroxyl groups, methoxyl groups, and carboxyl groups. For example, the functional groups contained in the caustic extract of Douglas fir bark, kraft lignin, and sulfite lignin are shown below.

| Group | Caustic extract of Douglas fir bark, percent | Kraft lignin, percent | Sulfite lignin, percent |
|---|---|---|---|
| Methoxyl | 3.5 | 15 | 13 |
| Carboxyl | 15 | 0.5 | 0.5 |
| Phenolic | 10 | 4 | 2.5 |
| Alcoholic | 1.5 | 0.5 | 0.5 |
| Carbonyl | 3.2 | 1.8 | 1.4 |

Practical methods for removal of colloidal particles from sewage and wastes are typically carried out in three stages. In the first, one or more chemical coagulants and coagulation aids are added to the sewage or wastes and distributed as quickly and uniformly as possible (flash-mixing). The second stage is flocculation. It is the most important step and is usually carried out in long slowly stirred tanks. The third stage is the final agglomeration of the particles and is greatly aided by the addition of coagulation aids, usually long chain high molecular weight molecules.

The unmodified phenolic forest-derived compounds from bark extractives and pulping liquors are useful only as coagulation aids in conjunction with conventional coagulants, either organic or inorganic. The chemically modified compounds, however, may be used as coagulants or coagulation aids with or without the addition of other conventional coagulants, such as alum and known organic polyelectrolytes.

Small amounts, i.e., 1 to 500 p.p.m. of the unmodified and modified phenolic forest-derived products are generally sufficient for treatment of sewage and other wastes. The optimum amount for treating a particular system is dependent on the kind and amount of coagulant and/or coagulation aid, temperature, pH, concentration of dissolved solids, rate of mixing, design of equipment, and the type of colloidal material encountered.

The modified compounds of this invention are particularly applicable to the water treatment of sewage wastes but can also be used in the clarification of brines and slurries, froth flotation processes, and in thickening processes of various kinds.

The following examples serve to illustrate the preparation of compounds according to this invention and are not intended to be limiting in any way.

EXAMPLE I

A caustic extract of Douglas fir bark, 20 grams, in 200 ml. water at about 10° C. and a pH of 8.8 was treated with a solution of 3 grams of cyanuric chloride dissolved in 20 ml. of dioxane added dropwise with stirring. The reaction mixture was maintained below 10° C. and stirred for about 1 hour and then allowed to warm to room temperature. During the reaction the pH was maintained at about 9 by the addition of 35 ml. of 1 N sodium hydroxide. The reaction solution was added directly to an aqueous dispersion difficult to coagulate.

EXAMPLE II

A solution of sodium lignosulfonate, 35 grams in 200 ml. of water, was stirred at about 10° C. and pH 9 with 3 grams of cyanuric chloride dissolved in 20 ml. of dioxane for 90 minutes. The reaction solution was added directly to an aqueous dispersion difficult to coagulate.

EXAMPLE III

A solution of a caustic extract of Douglas fir bark, 10 grams, was heated for two hours at 70–80° C. with 2.7 grams of a 37% solution of formaldehyde and 0.5 gram sodium hydroxide in a total volume of 160 ml. The reaction solution was added directly to an aqueous dispersion difficult to coagulate.

EXAMPLE IV

A solution of kraft lignin, 100 grams in 500 ml. water containing 4 grams of sodium hydroxide, was heated for two hours with 54 ml. of a 37% solution of formaldehyde and allowed to stand overnight. The reaction solution was added directly to an aqueous dispersion difficult to coagulate.

EXAMPLE V

A solution of sodium lignosulfonate (Marasperse "N"), 30 grams in 215 ml. water at pH 11, was refluxed for about two hours with 16 ml. of a 37% solution of formaldehyde. The reaction mixture was added directly to an aqueous dispersion difficult to coagulate.

EXAMPLE VI

A solution of the compound of Example III, 18.6 grams in 200 ml. of water, was stirred at less than 10° C. with 3 grams of cyanuric chloride dissolved in dioxane for one hour and then at ambient temperature for an additional hour. The reaction product was added directly to an aqueous dispersion difficult to coagulate.

EXAMPLE VII

A solution of a caustic extract of Douglas fir bark, 20 grams, was stirred with a pre-reacted mixture of 3 grams of cyanuric chloride and 2.3 grams of choline chloride at about 10° C. for about one hour, then at ambient temperature overnight. The reaction product was added directly to an aqueous dispersion difficult to coagulate.

EXAMPLE VIII

Kraft lignin, 5 grams, was added to a pre-reacted mixture of 1.84 grams cyanuric chloride and 1.4 grams choline chloride at about 10° C. and stirred for 90 minutes. Some precipitation occurred. The supernatant material was added directly to an aqueous dispersion difficult to coagulate.

EXAMPLE IX

A solution of a caustic extract of Douglas fir bark, 10 grams in 135 ml. of water, was heated with 1 gram of tetrakishydroxymethyl phosphonium chloride and 0.5 gram of sodium hydroxide for about two hours at 70–80° C. The reaction product was added directly to an aqueous dispersion difficult to coagulate.

EXAMPLE X

A solution of a caustic extract of Douglas fir bark, 6 grams in 100 ml. water, was stirred with 1.84 grams cyanuric chloride at about 10° C. for about one hour and then 1.22 grams of tetrakishydroxymethyl phosphonium chloride were added and the solution stirred for an additional hour. The reaction solution was added directly to an aqueous dispersion difficult to coagulate.

EXAMPLE XI

A solution of a caustic extract of Douglas fir bark, 20 grams in 200 ml. water, was heated with trimethylolmelamine made by condensing 2 grams of melamine with 4 ml. of a 37% solution of formaldehyde, under reflux conditions for about 30 minutes. The reaction solution was added directly to an aqueous dispersion difficult to coagulate.

EXAMPLE XII

Kraft lignin, 25 g. in 30 ml. of 1 N sodium hydroxide, was heated with trimethylolmelamine made by condensing 3.8 g. melamine and 3 g. formaldehyde at 80° C. for 2 hours at pH 10.5. The reaction solution was added directly to an aqueous dispersion difficult to coagulate.

EXAMPLE XIII

The product of Example XI, 10 grams in 100 ml. water, was stirred with 1.5 grams of cyanuric chloride at about 10° C. for 1 hour and then additionally stirred at ambient temperature for an additional hour. The reaction solution was added directly to an aqueous dispersion difficult to coagulate.

EXAMPLE XIV

The product of Example III, 18.6 grams in 200 ml. water, was stirred with 4 grams of 2,4-dichloro-6-methoxy-s-triazine dissolved in 20 ml. dioxane at about 10° C. for approximately one hour. The reaction solution was added directly to an aqueous dispersion difficult to coagulate.

EXAMPLE XV

A solution of a caustic extract of Douglas fir bark, 6.65 grams in 100 ml. water, was treated with 4.3 grams NN-diethylglycidylamine adjusted to a pH of 3, and stirred for about 60 hours. The reaction solution was added directly to an aqueous dispersion difficult to coagulate.

EXAMPLE XVI

A solution of a caustic extract of Douglas fir bark with the wax removed, 20 grams in 200 ml. water, was stirred overnight with 10.1 grams of an amine-modified epoxy compound having the formula

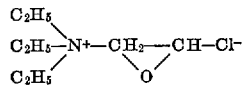

The reaction solution was added directly to an aqueous dispersion difficult to coagulate.

EXAMPLE XVII

A solution of Kraft lignin, 25 grams in 125 ml. of 1 N sodium hydroxide was shaken with the amine-modified epoxy compound of Example XVI for about 20 hours. The reaction solution was added directly to an aqueous dispersion difficult to coagulate.

EXAMPLE XVIII

A solution of a caustic extract of Douglas fir bark, 10 grams in 200 ml. water, was stirred with 1.7 grams of a hydrazide having the formula

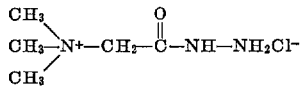

for 30 minutes at room temperature. The reaction solution was added directly to an aqueous dispersion difficult to coagulate.

EXAMPLE XIX

A solution of kraft ligin, 16 grams in 200 ml. water containing 9 grams of sodium hydroxide, was stirred for 30 minutes at room temperature with 1.7 grams of a hydrazide having the following formula:

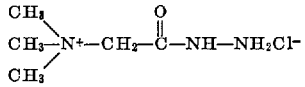

The reaction solution was added directly to an aqueous dispersion difficult to coagulate.

EXAMPLE XX

A solution of sodium lignosulfonate, 20 grams in 150 ml. water at pH 4.8, was stirred overnight at room temperature with 1.7 grams of a hydrazide having the same formula as that in Example XIX. The reaction solution was added directly to an aqueous dispersion difficult to coagulate.

EXAMPLE XXI

A solution of a caustic extract of Douglas fir bark with the wax fraction removed, 20 grams in 200 ml. water, was digested to a pH of about 6 using 50% hydrochloric acid and treated at room temperature with 4.3 grams of ethyleneimine added dropwise with stirring. The pH was maintained at 6 by the simultaneous addition of 50% hydrochloric acid. After stirring for about 1½ hours, the reaction mixture was digested to pH 2 using 50% hydrochloric acid and again treated at room temperature with 2.4 grams of ethyleneimine added dropwise with stirring. The pH was maintained in the 2–3 pH range by the simultaneous addition of 18.3 ml. of 50% hydrochloric acid and the reaction mixture stirred overnight. The reaction solution was added directly to an aqueous dispersion difficult to coagulate.

EXAMPLE XXII

A solution of kraft lignin, 25 grams in 500 ml. aqueous sodium hydroxide, was adjusted to pH 6 using concentrated hydrochloric acid and treated at room temperature with 4.3 grams of ethyleneimine added dropwise with stirring. The pH was maintained at 6 by the simultaneous dropwise addition of concentrated hydrochloric acid. After stirring for 1 hour, the reaction mixture was allowed to stand overnight at room temperature. A brown powder separated from the solution. This fraction was isolated by reduction of the pH to 0.3 with a 6% sulfuric acid solution and centrifugation. After purification by repeated water washings, the fraction was oven-dried and found to contain 1.6% nitrogen. A portion of the total reaction mixture was rendered alkaline and evaporated to dryness. The solid obtained corresponded to 62.5 grams of product and contained 2.25% nitrogen representing 100% of the added ethyleneimine. This product was added directly to an aqueous dispersion difficult to coagulate.

EXAMPLE XXIII

A solution of sodium lignosulfonate, 25 grams in 250 ml. water, was adjusted to pH 6 using concentrated hydrochloric acid and treated at room temperature with 4.3 grams of ethyleneimine added dropwise with stirring. The pH was maintained at 6 by the simultaneous dropwise addition of concentrated hydrochloric acid. After stirring for 1 hour the reaction mixture was allowed to stand for 14 days. The fraction which separated was isolated by centrifugation and purified by repeating washing with water. Acidification of the supernatant liquor to pH 2 produced a negligible amount of precipitate. The oven-dried fraction contained 3.6% nitrogen. Analysis of the total reaction mixture which had been rendered alkaline gave a nitrogen content of 5.3% representing 90% of the added ethyleneimine. This solution was added directly to an aqueous dispersion difficult to coagulate.

EXAMPLE XXIV

A solution of the caustic extract of Douglas fir bark, 60 grams in 600 ml. of water, was adjusted to pH 4.9 using concentrated sulfuric acid, treated with one gram of ferrous sulfate and 25 grams of potassium persulfate and heated to 70° C. for 2 hours. The hot reaction solution, at a pH of 2.2, was adjusted to pH 9.6 and added directly to an aqueous dispersion difficult to coagulate.

The compounds prepared according to the above examples were tested as coagulants for a 1% dispersion of titanium dioxide in water using the Jar-Test Procedure as described in volume 49 of the Journal of the American Water Works Association, November 1957, pages 1425–1431 and the results tabulated in Table I. The settling time after the mixing was stopped was taken as the time for the floc to fall to the 20 mm. mark on a 100 mm. graduated cylinder. NT and T in Table I are abbreviations of "not transparent" and "transparent." The floc size was determined by visual estimation.

TABLE I

| Product of Example Numbers | Intrinsic Viscosity | Weight Used, mg./g. TiO$_2$ | Floc Size (visual estimates) | Settling Time, Min. | Turbidity of Supernatant Liquor | |
|---|---|---|---|---|---|---|
| | | | | | Immediate | Final |
| I | 0.12 | 2 | Large | 3 | NT | T |
| II | 0.04 | 1 | Small | Slow | NT | T |
| III | 0.12 | 2.5 | do | 6 | NT | T |
| IV | 0.06 | 2 | Med.-large | 4.5 | NT | T |
| V | 0.04 | 1 | Small | 5 | NT | T |
| VI | 0.15 | 1 | Med.-large | 3.5 | NT | T |
| VII | 0.09 | 1.25 | do | 4.25 | NT | T |
| VIII | 0.06 | 1.25 | Med | 4.5 | NT | T |
| IX | | 2 | Small | 6.5 | NT | T |
| X | 0.16 | 2.5 | Med | 6 | NT | T |
| XI | 0.13 | 1.1 | Med.-small | 4 | NT | T |
| XII | 0.10 | 1 | Med | 5 | NT | T |
| XIII | 0.04 | 4 | Med | 5 | NT | T |
| XIV | 0.13 | 2.5 | Med | 3.5 | NT | T |
| XV | | 1 | Small | 4.5 | NT | T |
| XVI | | 1-2 | Very small | | NT | NT |
| XVII | | 2 | do | | NT | NT |
| XVIII | | 2 | Med.-small | | NT | T |
| XIX | | 1.5 | Small | | NT | T |
| XX | | 0.5 | do | | NT | T |
| XXI | | 2.5 | Med.-large | 15 | NT | T |
| XXII | 0.14 | 1 | Med | 3 | NT | T |

The chemically modified forest-derived products made according to the above examples were also evaluated as coagulation aids in conjunction with alum for a titanium dioxide dispersion in water. The results are shown in Table II. The light transmittance is an indication of the effectiveness of the coagulant in conjunction with the coagulation aid—the higher the transmittance the better the coagulation. In Table II, the amount of alum used was 1.5% by weight of the titanium dioxide solids. The total mixing time was 12 minutes and the flocculation formation mixing speed was about 50 r.p.m. Light transmittance was measured after 30 minutes settling time. Both modified and unmodified phenolic forest-derived products were tested.

TABLE II.—ALUM PLUS COAGULANT AID—1% TITANIUM DIOXIDE DISPERSION IN WATER

| Aid | Usage, percent by wt. of TiO$_2$ solids | Percent Light Transmittance | Usage, percent by wt. of TiO$_2$ solids | Percent Light Transmittance |
|---|---|---|---|---|
| Alum alone—no coagulation aid | | 0 | | 0 |
| Product of Example VI | 0.25 | 80 | 0.275 | 84 |
| Product of Example XIV | 0.225 | 75 | 0.275 | 72 |
| Product of Example I | 0.22 | 65 | 0.28 | 79 |
| Product of Example III | 0.23 | 50 | 0.29 | 72 |
| Product of Example XXI | 1.00 | 94 | | |
| Alkaline extract of Douglas fir bark | 0.26 | 64 | 0.31 | 68 |
| Orzan P (modified ammonium lignosulfonate) | 0.25 | 59 | 0.35 | 90 |
| Orzan S (sodium lignosulfonate) | 0.25 | 87 | 0.35 | 93 |
| Marasperse C (calcium lignosulfonate) | 0.25 | 87 | 0.30 | 90 |
| Indulin C (sodium salt of alkali lignin) | 0.25 | 83 | 0.20 | 78 |

As shown in Table II, alum alone was completely ineffective in coagulating the titanium dioxide dispersion. Alum in conjunction with the various modified and unmodified bark extractives and pulping liquors, however, showed a marked increase in the coagulation ability of the alum mixture.

In Table III, the chemically modified products were tested as coagulation aids in a clay-river system. To Columbia River water containing about 0.2% by weight suspended and dissolved solids was added .70% by weight clay (Georgia Kaolin Hydrite R). The alum usage was 1.71% by weight of the solids in the water. Total mixing time was 6 minutes and the floc formation mixing speed was 30 r.p.m. The percent light transmission measurements were taken after 30 minutes settling time.

TABLE III.—ALUM PLUS COAGULANT AID—0.72 SOLIDS IN COLUMBIA RIVER WATER

| Aid | Usage, percent by wt. of river water solids | Percent Lt. Trans. | Usage, percent by wt. of river water solids | Percent Lt. Trans. | Usage, percent by wt. of river water solids | Percent Lt. Trans. |
|---|---|---|---|---|---|---|
| Alum alone—no coagulant aid | 0.069 | 91 | 0.139 | 91 | 0.208 | 91 |
| Product of Example XXI | 0.069 | 94 | 0.139 | 96 | 0.208 | 96 |
| Product of Example XIV | 0.069 | 91 | 0.139 | 93 | 0.208 | 93 |
| Product of Example VI | 0.069 | 92 | 0.139 | 93 | 0.208 | 94 |
| Product of Example III | 0.069 | 92 | 0.139 | 93 | 0.208 | 93 |
| Product of Example I | 0.069 | 88 | 0.139 | 92 | 0.208 | 94 |
| Product of Example XXII | 0.069 | 95 | 0.139 | 95 | 0.208 | 96 |
| Alkaline extract of Douglas fir bark | 0.069 | 89 | 0.139 | 89 | 0.208 | 90 |

Unmodified caustic alkaline extract of Douglas fir bark was tested as a coagulation aid in conjunction with a commercially available polyelectrolyte, Separan NP 10, a nonionic polyacrylamide of the Dow Chemical Company. Polyethyleneimine was also tested. Separan NP 10 and the unmodified caustic extract of Douglas fir bark were added to a 1% dispersion of titanium dioxide in water and evaluated according to the Jar-Test Procedure as described in connection with Table I. The results are shown below in Table IV.

TABLE IV

| Coagulant | Amount used, mg./g. TiO₂ | Floc Size | Settling Time, Mins. | Turbidity of Supernatant Liquor Immediate | Final |
|---|---|---|---|---|---|
| Separan NP 10 | 0.5 | Large | 1.5 | NT | NT |
| Separan NP 10 Plus Alkaline extract of Douglas fir bark | 0.25 0.5 | Very large | 1.0 | NT | T |
| Polyethyleneimine Plus Alkaline extract of Douglas fir bark with wax fraction removed | 0.2 2.5 | Med. large | 5 | NT | T |

The addition of the alkaline extract of Douglas fir bark to the Separan NP 10 permitted a 50% reduction in the Serapan NP 10 level and resulted in faster settling and a clear supernatant liquor.

It is apparent from the reading of the specification and the examples that the compounds made according to this invention are effective coagulants and coagulation aids, are relatively inexpensive, and can be used in a wide variety of ways.

What is claimed is:

1. Process of making products which comprises reacting together in a weight ratio ranging from 2:1 to 15:1 a lignin containing material with at least one reactive compound selected from the group consisting of (1) a triazine derivative designated by

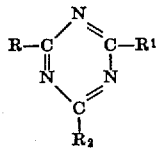

where R, R¹, and R² represent chlorine, methoxy groups or —NHCH₂OH groups (2) Y—CH₂—CH₂)ₙ—X where $n$ is a positive integer from 0 to 5; X is one of the following:

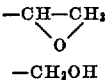

—CH₂OH

and Y is one of the following:

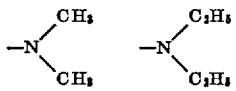

(3) 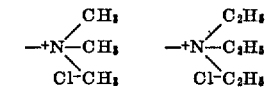

where Z⁻ is chlorine or bromine, and R₃, R₄, R₅, and R₆ are —CH₂OH groups.

2. The process according to claim 1 wherein the lignin containing material is a material selected from the group consisting of kraft lignin, sulfite lignin and alkaline extracts of barks of trees.

3. The product of the process of claim 2.

4. Process according to claim 1 wherein the reactive compound is a triazine derivative selected from the group consisting of cyanuric chloride, 2,4-dichloro-6-methoxy-s- triazine and trimethylolmelamine.

5. The product of the process of claim 4.

6. Process according to claim 1 wherein the reactive compound is one selected from the group consisting of choline chloride, NN-diethylglycidylamine, hydrazides, and amine-modified epoxy compounds.

7. The product of the process of claim 6.

8. Process of claim 1 wherein the reactive compound is tetrakishydroxymethyl phosphonium chloride.

9. The product of the process of claim 8.

References Cited

UNITED STATES PATENTS 3,296,159   1/1967   Lissner _____ 260—124 XR

FOREIGN PATENTS 702,827   1/1965   Canada.

CHARLES B. PARKER, Primary Examiner
D. R. PHILLIPS, Assistant Examiner

U.S. Cl. X.R.

210—54; 252—315; 260—627